May 29, 1934.  R. E. SULLIVAN  1,960,601
VENTILATING DEVICE FOR AUTOMOBILE DOORS
Filed Jan. 3, 1933
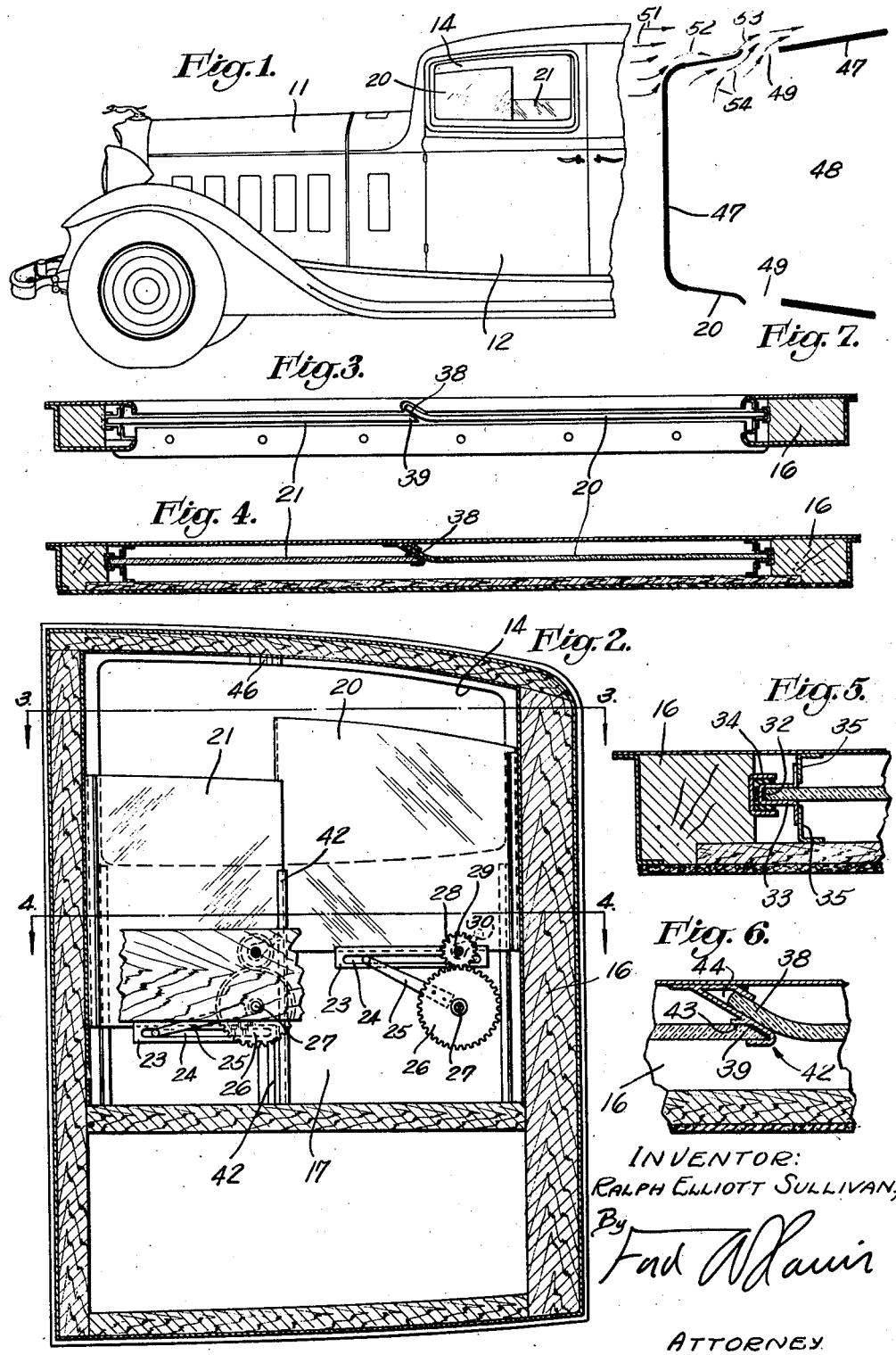
INVENTOR:
RALPH ELLIOTT SULLIVAN,
By
ATTORNEY Patented May 29, 1934

1,960,601

UNITED STATES PATENT OFFICE 1,960,601

VENTILATING DEVICE FOR AUTOMOBILE DOORS

Ralph Elliott Sullivan, Los Angeles, Calif.

Application January 3, 1933, Serial No. 649,974

5 Claims. (Cl. 296—44)

My invention relates to a vehicle ventilating device, and relates particularly to a ventilating device or ventilating means adapted for use in a window opening of an automobile or other vehicle adapted to move on the ground or in the air.

In view of the fact that my invention has a particular utility in the automotive industry, I will describe my invention as applied to a window opening of an automobile. It should be understood, however, that my invention may be applicable in other industries, and I do not by reason of this description wish to have my invention limited to the automotive industry. I believe my invention to be broadly new in its entirety and further believe that various sub-combinations and elements less than my invention in its entirety are also patentable over the prior art.

In order that my invention may be better understood, I will briefly refer to ventilating means which are at present employed on automobiles. Prior to my invention it was common practice to provide the window opening of an automobile with a single pane of glass which could be lowered to partly or fully open the window. When the term "window opening" is used, I use the term broadly and refer to any opening which in an automobile or other vehicle is commonly employed as a window and which ordinarily has a pane of glass which can be moved into the window opening to completely close same or which can be withdrawn partly or fully from the window opening in order that ventilation may be provided. At the present time, the window openings in automobiles are provided with a pane of glass which moves vertically, and when it is desired to open the window, a crank is turned to operate the window raising or lowering mechanism, and to open the window the pane of glass is lowered. This provides a space of horizontal extension entirely across the upper part of the window opening. The window pane may be lowered to give the desired area of ventilation space. When such window opening has been opened, as explained, sufficiently to give an adequate supply of fresh air for the occupants of the vehicle, a draft will be created. At certain times, particularly in winter, such a draft is quite injurious to the health of individuals in the vehicle. This is especially true with respect to the occupants of the front seat, for the reason that when the window panes of the front windows are lowered, a draft is produced which strikes these occupants on the head and the back of the neck, and the occupants, if they are not in proper physical condition, will be liable to catch a cold or be afflicted with any other ailment which results from such a draft.

It is an object of my present invention to provide a window ventilating means which is so designed that ventilation may be produced in a vehicle, such as an automobile, without subjecting the occupants to a draft.

In the preferred form of my invention, I provide a window opening with a pair of window pane members which are movable relative to each other and in which the window pane members can be adjusted so that a ventilation space is provided without causing a draft. In the preferred form of my invention there are two window pane members, one of which may be termed a "front pane" and the other of which may be termed a "back pane". These panes occupy the front and back parts of the window opening respectively, and both are vertically movable from positions in which the window opening is entirely closed to positions in which the window opening is entirely open. The panes, however, may be adjusted to various positions between these two extreme positions just pointed out. In the form of my invention which I have found to give the best results, the front pane is provided with an outwardly directed portion which preferably, but not necessarily, overlaps the adjacent vertical edge of the back pane, thus forming a seal between the two panes when both window panes are in fully closed position. The outwardly directed portion performs the very important function of directing the air outwardly. This outwardly directed air directly in front of the back pane tends to produce a suction at this point by the injector principle, and rather than cause air to flow inwardly at this point it causes the air in the vehicle to be sucked outwardly at this point, thus producing a ventilation flow which is in an outward direction rather than in an inward direction as occurs in the ordinary form of window.

It should be understood that the construction which I have just outlined is the preferred form of my invention. The invention may be embodied in other forms not including each and every feature of the preferred form of my invention; as an example, the front pane need not be adjustable, but can be permanently fixed in place and only the back pane is movable between fully closed and fully opened positions. In this form of my invention it is impossible to completely open the entire window opening, but it is possible to produce the ventilating advantages of my invention. The front pane then acts as a window through which the occupants in the vehicle may look, but can never be removed to enlarge the effective ventilation space of the window opening. Other changes may be made in the form of my invention without departing from the spirit and scope thereof, and for this reason I desire my present description of the invention to be looked upon as a disclosure to those skilled in the art which will enable them to construct the preferred form of my invention. I do not wish to be limited to this preferred form, but wish the invention to be construed in accordance with the claims of this specification which appear at the end of the description.

Other advantages of my invention will be emphasized in the course of the description of the preferred form of my invention. In the accompanying drawing in which my invention is illustrated:

Fig. 1 is a fragmentary elevational view showing my invention applied to the window opening of an automobile.

Fig. 2 is an enlarged vertical sectional view of an automobile window showing my invention applied thereto.

Fig. 3 is a section taken on the line 3—3 of Fig. 2.

Fig. 4 is a section taken on the line 4—4 of Fig. 2.

Fig. 5 is an enlarged fragmentary sectional view showing the manner in which the window panes are supported at the front and rear parts of the window opening.

Fig. 6 is a fragmentary sectional view showing the manner in which the window panes are supported at their adjacent portions.

Fig. 7 is a very diagrammatic view illustrating the air currents which are produced by the use of my invention.

Referring now to the drawing in detail, I will describe the details of construction of the form of my invention which at present I believe to be the preferred form thereof.

The numeral 11 represents an automobile which may be of any of the well-known makes, the construction of the automobile being immaterial except with respect to that part which relates particularly to my invention. The automobile 11 is provided with a door 12 having a window opening 14. My invention is incorporated in the door 12 and is adapted to operate in conjunction with the window opening 14.

It should be clearly understood that one or more doors having window openings 14 may be provided with my invention and that any other window opening of the vehicle may also be provided with the ventilating means of my invention. I again wish to emphasize that my invention is not limited to use in the automotive industry.

As shown better in Figs. 2 to 5 inclusive, the door 12 is provided with a frame construction 16 which may be of standard construction with the exception that it is designed particularly to receive the parts which are of necessity incorporated in this door 12 in order that my invention may be embodied therein. The window opening 14 is positioned at the upper part of the door 12 and therefore the lower part of the door 12 provides a space or chamber 17 in which the window panes are received when they are in a retracted or open position. The window panes of my invention are provided in the form of a front pane 20 and a back pane 21. The front pane 20 is adapted when in closed position to close the front part of the window opening 14, and the back pane when in closed position is adapted to close the back part of the window opening 14. For the purpose of moving the window panes 20 and 21 between closed and open positions, I provide a pair of entirely separate and independent operating means in order that each window pane may be opened or closed independently of the other. The operating means, however, are identical to each other and the same numbers will be utilized therefor in connection with the equivalent parts. Connected to the lower part of each pane 20 and 21 is a slide member 23 having a horizontal slot 24 into which the outer end of an arm 25 is extended. This arm 25 is secured to a gear 26 which is rotatably mounted on a shaft 27 and which is engaged by and adapted to be rotated by a smaller gear 28. This smaller gear 28 is secured on a shaft 29 which extends outwardly from the interior of the door and has an operating crank 30 mounted on the outer end thereof. By turning the operating crank 30, the gears 28 and 26 are rotated and the arm 25 is swung upwardly or downwardly. It will be seen that when the arm 25 is swung upwardly, the window pane, either 20 or 21, will be closed and that when the arm 25 is swung downwardly, the window pane, either 20 or 21, will be opened. It will further be seen that these two operating means are entirely independent of each other and that one window pane, either 20 or 21, may be opened or closed independently of the other. The operating means is merely illustrative of one type which may be employed as a part of my invention. Other types of operating means which will open and close the window panes independently of each other may be employed if desired.

The front part of the window pane 20 and the rear part of the window pane 21 are supported in vertically arranged guides which fit adjacent the frame members 16. The guides may be of any well-known construction and are illustrated in Fig. 5. Since both of these guides may be identical, only one will be shown in detail. The vertical edge of the pane is represented by the numeral 32 and is adapted to fit into a channel member 33 which is received in a resilient or shock-proof receiving channel 34. The channel 33 is positioned in the rear of a pair of angles 35 which are rigidly mounted in the door. When the pane, which may be either the pane 20 or 21, is raised and lowered, the channel 33 moves upwardly or downwardly therewith relative to the resilient channel 34 and the angles 35.

As shown best in Figs. 3 and 4, the rearward part of the front pane 20 is provided with an outwardly directed portion 38 which is of vertical extension, this outwardly directed portion 38 extending from the upper to the lower end of the front pane 20. The outwardly directed portion 38 overlaps a forward vertical part 39 of the back pane 21 and thus provides a joint of such a nature that when both windows are in raised position there will be no draft. This outwardly turned portion 38, however, performs the function of directing the flow of air outwardly at this point, as will be described hereinafter, particularly in connection with Fig.

7. With respect to the outwardly directed portion 38, it should be understood that this outwardly directed portion need not be limited to the rearward portion of the front pane 20, but might be of greater width in order that a larger portion of the front pane 20 would extend outwardly.

For the purpose of supporting the adjacent portions of the window panes 20 and 21, I provide a supporting member 42 which is shown clearly in Fig. 6. This supporting member 42 provides a channel 43 for receiving the forward edge 39 of the back pane 21 and provides a curved channel 44 for receiving the rear outwardly directed portion 38 of the front pane 20. This supporting member 42 is suitably secured in the door 12. This supporting member 42 extends as high as the lower limit of the window opening 14 but does not extend upwardly across the window opening 14, since such a construction would obscure vision. The upper wall of the window opening 14 is therefore provided with a supporting mamber 46 which is of the same cross section as the supporting member 42 in which the upper ends of the front and back panes 20 and 21 are received when the window panes are both in closed positions.

The foregoing description explains the details of construction of the parts of my invention which are provided by the preferred form of my invention. In using the invention the window panes 20 and 21 are individually adjusted to proper positions. The front pane 20 may be fully closed and the back pane 21 may be fully or partly opened as desired. Likewise, both panes may be fully closed or fully opened. When the window panes 20 and 21 are positioned as shown in Fig. 2, there will be a draft created in the upper part of the window opening 14 in view of the fact that the front window pane 20 is lowered a slight distance. If this front window pane is raised so that the front portion of the window opening is completely closed, there will be no draft in the upper part of the car. In my invention the draft is completely eliminated, or eliminated to the extent that it is not injurious to health, by keeping the front window pane 20 completely closed and by opening the back window pane 21 to give the desired ventilation. In Fig. 7 I have illustrated the manner in which the ventilation is accomplished by my invention when the front pane 20 is fully closed and when the back pane 21 is fully opened. Fig. 7 is a diagrammatic view in which 47 indicates the outline of the body in horizontal cross section. In other words, the line 47 indicates the vertical boundaries which define the interior 48 of the vehicle. The pane 20 is indicated but the pane 21 is not indicated, and a space 49 is shown in view of the fact that in this diagrammatic illustration of my invention the window pane 21 is in lowered position. When the vehicle moves forwardly, drafts or currents of air strike the front part of the vehicle and are directed along the sides of the vehicle as indicated by the arrows 51. The currents of air which strike the forward part of the body of the vehicle are deflected outwardly and curved around the side walls of the vehicle as indicated by the arrow 52. It may be considered that a slight vacuum may be produced at the corner of the body of the vehicle and that there is a tendency for the current of air after passing the corner of the vehicle to pass inwardly toward the side wall of the vehicle. If the front pane 20 were in lowered position, a current of air, as indicated by the arrow 52, would flow freely through the forward portion of the window opening 14; however, since this portion of the window opening is covered by the front pane 20, it is prevented from passing inwardly and is directed outwardly. The rearward portion 38 of the front pane 20 which is outwardly directed, as previously explained, tends to cause the current of air to be forced outwardly, as indicated by the arrow 53, and it therefore tends to pass by the opening 49 and tends to be guided so that it will not flow inwardly through the opening 49. In other words, a suction is created at this point by the rapid flow of air on the exterior of the vehicle and a sort of injector effect is produced. This causes the air in the forward part of the interior 48 to be sucked outwardly through the opening 49, as indicated by the arrows 54. It will therefore be seen that in my invention the air, instead of flowing inwardly, causing a draft through the window opening 14, is sucked outwardly on the injector principle, which is just the reverse of the action which occurs where the ordinary single pane window is employed.

If it is desired to have a draft through the car, the front pane 20 may be lowered either partly as shown in Fig. 2, or fully by a simple manipulation of the forward crank 30. Either pane 20 or 21, as previously pointed out, may be fully opened or closed or may be adjusted to some intermediate position if desired.

If desired the front pane 20 may be secured in closed position and not adjustable between the closed and an open position. In this form of my invention the back pane 21 may be adjusted as desired. The front pane 20 would then not operate as an adjustable pane but would serve merely as a transparent member through which the occupants of the vehicle might look to the exterior of the vehicle.

As previously pointed out, I have illustrated the preferred form of my invention only and I recognize that various changes may be made without departing from the spirit and scope of the invention. I, therefore, wish the invention to be construed solely in accordance with the appended claims taken in conjuction with the preceding description.

I claim as my invention:

1. In a ventilating means for a vehicle body having a window opening, a combination of: a front pane arranged in the front portion of said window opening; and a back pane arranged in the back portion of said window opening, said panes being vertically adjustable independently of each other to either fully or partly close said window opening, said front pane having an outwardly directed portion extending over the forward part of said back pane, whereby when said back pane is lowered to provide an exhaust opening thereabove, air from the interior of said body will be withdrawn through said exhaust opening by the rush of air diverted away from the side wall of the body by said outwardly directed portion of said front pane when said vehicle is moving forwardly.

2. A ventilating means for a vehicle body having a window comprising: a pair of panes, one of which is adapted for vertical adjustment to close a part of said window opening and the other being capable of vertical adjustment to provide an exhaust passage thereabove, said closing pane having an outwardly directed portion extending over an end of said adjustable pane, whereby air from the interior of said body is caused to be withdrawn through said passage by the rush of air currents diverted from the side wall of said body when said vehicle is moving forwardly.

3. A ventilating means for a vehicle body having a window comprising: a pair of panes, each of which is capable of being moved vertically independently of and relatively to the other pane; and actuating mechanism for said panes by means of which said panes may be lowered so as to provide an inlet passage over one pane and an exhaust passage over the other pane, and one of said panes having a curved portion projecting outwardly over an end of the other pane, whereby atmospheric air will be drawn through said inlet passage and the air in said body will be sucked outwardly through said exhaust passage by the rush of air diverted from the side wall of said body when said vehicle is moving forwardly.

4. In a ventilating means for a vehicle body having a window opening, the combination of: a front pane vertically adjustable to close the front part of said window opening; and a back pane capable of vertical adjustment to provide a ventilating passage in the upper part of said window opening, said front pane having a portion extending outwardly over an end of said rear pane, so as to divert air currents away from the side wall of said body when said vehicle is moving forwardly, whereby air is prevented from entering said body through said passage.

5. In a ventilating means for a vehicle body having a window opening, the combination of: a pair of panes independently vertically adjustable to either partly or fully close said window opening; and a raising and lowering mechanism for said panes, by means of which said panes may be lowered to provide a ventilating passage immediately above each of said panes, and one of said panes having a curved portion extending outwardly over an end of the other pane, whereby the rush of air along the side wall of said body when said vehicle is moving forwardly will be diverted outwardly, in a manner to cause atmospheric air to be drawn through one of said passages and the air within said body to be withdrawn through the other of said passages.

RALPH ELLIOTT SULLIVAN.